(12) United States Patent
Ganireddy et al.

(10) Patent No.: US 11,938,877 B2
(45) Date of Patent: Mar. 26, 2024

(54) POWER GENERATION SYSTEM AND ASSOCIATED METHOD

(71) Applicant: Transportation IP Holdings, LLC, Norwalk, CT (US)

(72) Inventors: Govardhan Ganireddy, Roanoke, VA (US); Ajith Kuttannair Kumar, Erie, PA (US); Shahid Ali, Bangalore (IN); Prashanth Manikumar Chennamsetty, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/004,860

(22) Filed: Aug. 27, 2020

(65) Prior Publication Data
US 2020/0391682 A1    Dec. 17, 2020

Related U.S. Application Data

(63) Continuation of application No. 15/991,255, filed on May 29, 2018, now abandoned.

(51) Int. Cl.
| | |
|---|---|
| *B60R 16/03* | (2006.01) |
| *B60L 1/14* | (2006.01) |
| *B60L 50/10* | (2019.01) |
| *H02J 3/38* | (2006.01) |
| *H02M 7/23* | (2006.01) |

(52) U.S. Cl.
CPC ............. *B60R 16/03* (2013.01); *B60L 1/14* (2013.01); *B60L 50/10* (2019.02); *H02J 3/38* (2013.01); *H02M 7/23* (2013.01)

(58) Field of Classification Search
CPC .. B60R 16/03; B60L 50/10; B60L 1/14; H02J 3/38; H02M 7/23
USPC .......................................................... 307/10.1
See application file for complete search history.

(56) References Cited

U.S. PATENT DOCUMENTS

| 9,409,482 B2 * | 8/2016 | Bachmaier | B60L 1/003 |
| 2015/0239362 A1 * | 8/2015 | Mizuno | B60L 55/00 |
| | | | 307/10.1 |
| 2017/0250538 A1 * | 8/2017 | Wang | H02M 5/4585 |

\* cited by examiner

*Primary Examiner* — Daniel Kessie
*Assistant Examiner* — Dru M Parries
(74) *Attorney, Agent, or Firm* — Mary D. Lawlor; The Small Patent Law Group, LLC (57) ABSTRACT

A method includes detecting a determined operating condition of a first power converter that is one of a plurality of first power converters in a power generating unit, and the power generating unit is one of a plurality of power generating units. The method further includes responding to detection of the determined operating condition by: controlling, via at least one remaining first power converter of the plurality of first power converters, a load current flowing through a power bus coupled to the plurality of power generating units, and altering one or more droop characteristics corresponding to one or more second power converters disposed in other power generating units based at least in part on the controlled load current flowing through the power bus, wherein the one or more second power converters disposed in other power generating units are coupled to the power bus.

20 Claims, 4 Drawing Sheets

POWER GENERATION SYSTEM AND ASSOCIATED METHOD

CROSS-REFERENCE TO RELATED APPLICATIONS

This application is a continuation of and claims priority to U.S. patent application Ser. No. 15/991,255, filed 29 May 2018, and the entire contents of the foregoing application are incorporated herein by reference.

BACKGROUND

Technical Field

Embodiments of the present specification generally relate to a power generation system and in particular, to a method for controlling the power generation system in an event of one or more power converters in the power generation system experiencing a determined operating condition.

Discussion of Art

Power generation systems including alternators and/or other renewable or non-renewable power sources are typically being used in various applications including stationary applications such as uninterruptible power supply and mobile applications including vehicles. The power generation systems typically include power converters such as inverters and/or rectifiers to facilitate conversion of electrical power from one form to another form.

In certain stationary and mobile applications, to supply increasing power demands and to facilitate high availability/redundancy, sometimes, multiple power generation system blocks are operated in parallel or in other suitable configurations. When such multiple power generation system blocks are operational in a given power generation system, the power generation system blocks are required to be electrically synchronized before powering up electrical loads connected thereto. In particular, in some implementations where a centralized control of the power converters disposed in the multiple power generation system blocks is not possible and/or not permissible, synchronization of the operations of the power converters remains a challenging task. Moreover, when one or more such power converters fail and/or malfunction, it may be desirable to maintain continuity of the supply of the electrical power to the electrical load.

BRIEF DESCRIPTION

In accordance with one embodiment of the present inventive subject matter, a method is presented. The method includes detecting a determined operating condition of a first power converter that is one of a plurality of first power converters in a power generating unit, and the power generating unit is one of a plurality of power generating units. The method further includes responding to detection of the determined operating condition by: controlling, via at least one remaining first power converter of the plurality of first power converters, a load current flowing through a power bus coupled to the plurality of power generating units, and altering one or more droop characteristics corresponding to one or more second power converters disposed in other power generating units based at least in part on the controlled load current flowing through the power bus, where the one or more second power converters disposed in other power generating units are coupled to the power bus.

In accordance with another embodiment of the present inventive subject matter, a power generation system is presented. The power generation system includes a first power generating unit electrically coupled to a load via a power bus. The first power generating unit includes a plurality of first power converters and at least one first controller operatively coupled to the plurality of first power converters. The at least one first controller is configured to detect a determined operating condition corresponding to at least one first power converter of the plurality of first power converters. Further, the at least one first controller is configured to control, if the determined operating condition is detected, a load current flowing through the power bus via at least one remaining first power converter of the plurality of first power converters. Moreover, the power generation system includes a second power generating unit electrically coupled to the power bus. The second power generating unit includes a plurality of second power converters and at least one second controller operatively coupled the plurality of second power converters. The at least one second controller is configured to alter one or more droop characteristics corresponding to the plurality of second power converters based on the controlled load current flowing through the power bus.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "controller" may include either a single component or a plurality of components, which are active and/or passive and are connected or otherwise coupled together to provide the described function. In addition, the term "operatively coupled," as used herein, includes wired coupling, wireless coupling, electrical coupling, magnetic coupling, radio communication, software based communication, or combinations thereof.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In one embodiment, a method is provided for a power generation system that can include detecting an operating condition of a first power converter that is one of a first set of power converters. The power converters can be configured to receive first direct current output from a first power source in power generating units. The method can also include responding to detection of the operating condition by controlling, via at least one second power converter in the first set of power converters, a load current can be conducted through a power bus coupled to the power generating units. The at least one second power converter in the first set of power converters may not experience the operating condition. The method can also include responding to detection of the operating condition by altering one or more droop characteristics corresponding to one or more third power converters. The one or more third power converters can be configured to receive second direct current output from a second power source in the power generating units based at least in part on the load current that is controlled and conducted through the power bus. The one or more third power converters can be coupled to the power bus, and the one or more droop characteristics can be altered so that a total electrical power demand of a load is met uninterrupted.

In one embodiment, a power generation system is provided that can include first and second power generating units. The first power generating unit can be electrically coupled to a load via a power bus. The first power generating unit can include first power converters configured to receive first direct current output from a first power source and at least one first controller that can be operatively coupled to the first power converters. The at least one first controller can be configured to detect an operating condition corresponding to at least one first power converter of the first power converters. The at least one first controller can also be configured to control, responsive to detecting the operating condition, a load current conducted through the power bus via at least one second power converter of the first power converters. The second power generating unit can be electrically coupled to the power bus. The second power generating unit can include second power converters that can be configured to receive second direct current output from a second power source. The second power generating unit can also include at least one second controller that can be operatively coupled to the second power converters. The at least one second controller can be configured to alter one or more droop characteristics corresponding to the second power converters, based on the load current. The load current can be controlled and conducted through the power bus so that a total electrical power demand of a load is met uninterrupted.

In an embodiment, a system is provided that can include first and second power generating units. The first power generating unit can be configured to be electrically coupled to a load via a power bus. The first power generating unit can include first and second power converters that can be configured to receive first direct current output from a first power source. A first sensor can be configured to be coupled to the power bus. The first power generating unit can also include a first controller operatively coupled to the first and second power converters. The first controller can be configured to detect an operating condition corresponding to the first power converter. The first controller can also be configured to control, responsive to detecting the operating condition, a load current conducted through the power bus via the second power converter. The second power generating unit can be configured to be electrically coupled to the power bus. The second power generating unit can include third and fourth power converters that can be configured to receive second direct current output from a second power source. Further, the second power generating unit can also include a second sensor that can be configured to be coupled to the third and fourth power converters. Furthermore, the second power generating unit can also include a second controller that can be operatively coupled with the third and fourth power converters. The second controller can be configured to alter one or more droop characteristics corresponding to the third and fourth power converters based on the load current. The load current can be controlled so that a total electrical power demand of a load is met uninterrupted.

Figure 1:
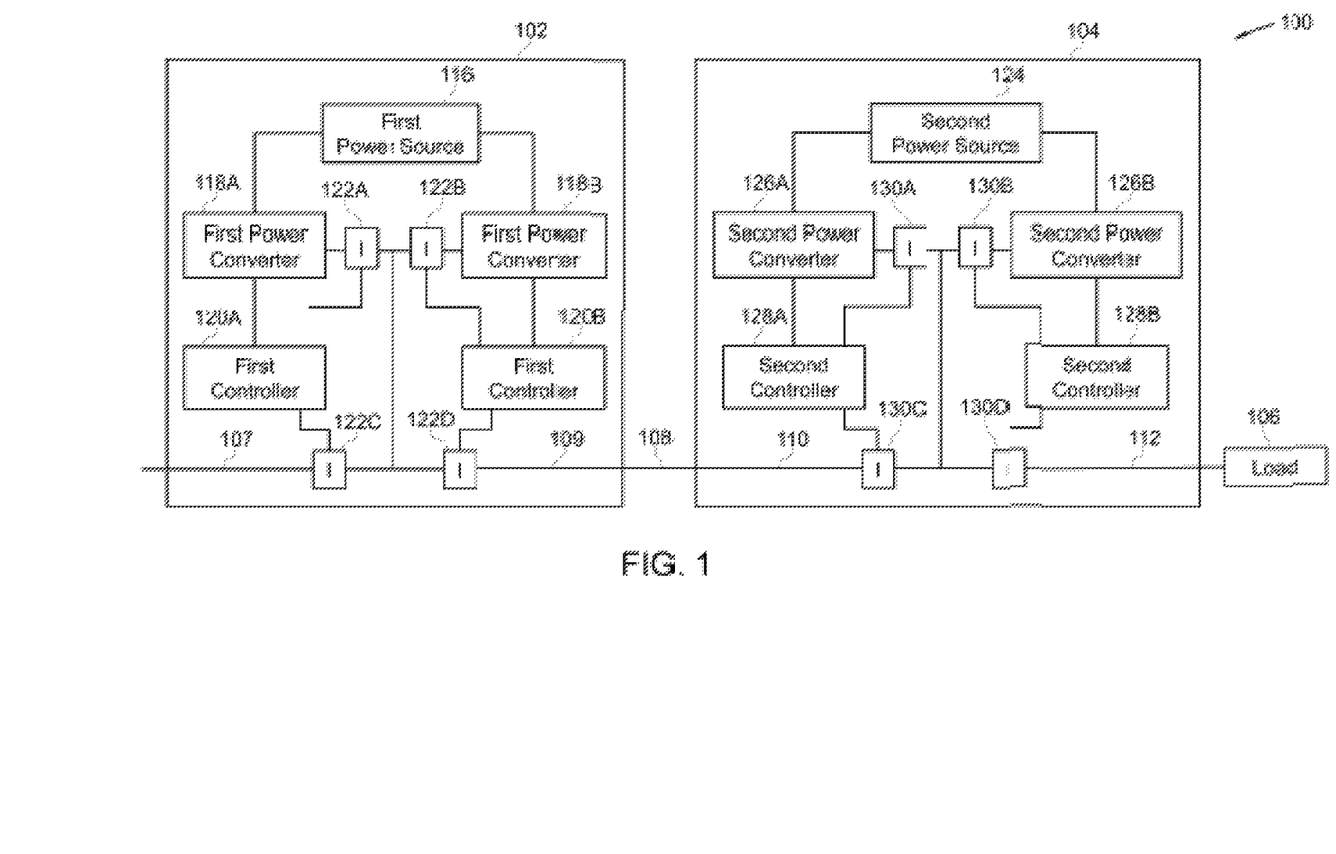
FIG. 1 is a block diagram of a power generation system, in accordance with one embodiment of the present specification.

Turning now to the drawings, in FIG. 1, a block diagram of a power generation system 100 is presented, in accordance with one embodiment of the present specification. The power generation system 100 of FIG. 1 may be employed as a stationary power generation system or a mobile power generation system. In the illustrated embodiment of FIG. 1, the power generation system 100 includes a plurality of power generating units such as a first power generating unit 102 and a second power generating unit 104. Hereinafter, the first and second power generating units 102, 104 may also be alternatively referred to as power generating units 102, 104. By way of example, one or both of the power generating units 102, 104 may be a stationary power generating unit, for example, an uninterruptible power supply (UPS) based system. By way of another example, one or both of the power generating units 102, 104 may be a mobile power generating unit such as a vehicle. Various examples of the vehicle may include one or more of trains, cars, trucks, boats, drones, and aircrafts, and the like. By way of another example, the power generating units 102, 104 may be locomotives.

Moreover, while the power generation system 100 of FIG. 1 is shown to include two power generating units 102, 104, use of more than two power generating units in the power generation system 100 is also envisioned within the purview of the present specification. The number of power generating units in the power generation system 100 may vary depending on the application and/or design considerations including but not limited to a rated power of the power generation system 100 and a rated power of each of the power generating units to be used.

In some embodiments, the first and second power generating units 102, 104 are electrically coupled to a power bus 108, as shown in FIG. 1. The first and second power generating units 102, 104 may be coupled to the power bus 108 to supply the electrical power thereto. Moreover, the power bus 108 is also electrically coupled to the load 106. More particularly, the first and second power generating units 102, 104 are coupled to the power bus 108 such that the electrical power may be supplied to the load 106 from one or both of the first and second power generating units 102, 104 via the power bus 108. The term "power bus" as used herein, refers to an electrical line which is used to couple electrical components of the first and second power generating units 102, 104. The power bus 108 may be a single phase or a multi-phase line, for example, a three-phase line. Reference numerals 107, 109 represent two ends of the power bus 108 within the first power generating unit 102. Further, reference numerals 110 and 112 represent two ends of the power bus 108 within the second power generating unit 104.

In some embodiments, each of the power generating units 102, 104 may include a power source, a plurality of power converters, one or more controllers, and one or more sensors. By way of example, the first power generating unit 102, as depicted in FIG. 1, may include a first power source 116, a plurality of first power converters such as first power converters 118A, 118B, one or more first controllers such as first controllers 120A, 120B, and one or more of first sensors 122A, 122B, 122C, 122D (hereinafter referred to as first sensors 122A-122D). In the embodiment of FIG. 1, the first power generating unit 102 is shown to include two first power converters 118A, 118B, two first controllers 120A, 120B, and four first sensors 122A-122D. However, use of the first power generating unit 102 including different number of components than depicted in FIG. 1 is also contemplated.

Further, in the embodiment of FIG. 1, the first power converters 118A, 118B are shown as electrically coupled in parallel with each other. It is to be noted that the plurality of first power converters may be arranged in other suitable configurations including but not limited to a series configuration, a series-parallel configuration, a networked configuration, and the like. In the first power generating unit 102, the first controller 120A is operatively coupled to the first power converter 118A and the first controller 120B is operatively coupled to the first power converter 118B to control respective operations. In some embodiments, the first controllers 120A, 120B of the first power generating unit 102 are communicatively coupled to each other. In certain other embodiments, a common single first controller (not shown) may be coupled to both the first power converters 118A, 118B.

The second power generating unit 104, as depicted in FIG. 1, may include a second power source 124, a plurality of second power converters such as second power converters 126A, 126B, one or more second controllers such as second controllers 128A, 128B, and one or more second sensors 130A, 130B, 130C, 130D (hereinafter referred to as second sensors 130A-130D). In the embodiment of FIG. 1, the second power generating unit 104 is shown to include two second power converters 126A, 126B, two second controllers 128A, 128B, and four second sensors 130A-130D. However, use of the second power generating unit 104 including different number of components than depicted in FIG. 1 is also contemplated. In some embodiments, the components of the second power generating unit 104 may be arranged in a similar fashion as described with reference to the first power generating unit 102.

In some embodiments, the first and second power sources 116, 124 as used respectively in the first and second power generating units 102, 104 may be representative of an electric machine capable of generating an electrical power, for example, a generator/alternator. The generator may be a synchronous generator, an asynchronous generator, a doubly-fed induction generator, and the like. The generator may be operated via a prime mover (not shown in FIG. 1) including, but not limited to, an engine, a compressor, a wind-turbine, a hydro-turbine, or any other suitable source of mechanical energy. By way of example, the generator used as the power source 116, 124 may generate alternating current (AC) power. In some embodiments, when the power sources 116, 124 generate the AC power, each of the power generating units 102, 104 may additionally include a rectifier (not shown in FIG. 1) electrically coupled to the respective power source 116, 124 to convert the AC power generated by the generator to a direct current (DC) power. In some embodiments, the power source 116, 124 may additionally or alternatively include a source that may generate direct current (DC) power, for example, a fuel-cell or a photovoltaic (PV) based power source.

Further, each of the first power converters 118A, 118B, and the second power converters 126A, 126B may be an inverter that is configured to convert the DC power received from the respective power source 116, 124 to an AC power. The first power converters 118A, 118B, and the second power converters 126A, 126B may be alternatively referred to as power converters 118A-126B. The AC power from the power converters 118A-126B is supplied to the load 106 via the power bus 108. The power converters 118A-126B may include an electronic circuit including plurality of switches (not shown in FIG. 1) to effect conversion of the DC power to the AC power. The switches used in the power converters 118A-126B may be electrically controllable switches, such as, semiconductor switches. Non-limiting examples of these semiconductor switches may include transistors, gate commutated thyristors, field effect transistors (FETs), insulated gate bipolar transistors (IGBTs), gate turn-off thyristors (GTOs), static induction transistors, static induction thyristors, or combinations thereof. Moreover, materials used to form the semiconductor switches may include, but are not limited to, silicon (Si), silicon carbide (SiC), gallium nitride (GaN), or combinations thereof.

The power converters 118A-126B may be three-phase inverters, for example. In each of the power converters 118A-126B, the switches may be arranged in one or more phase-legs where each phase-leg generates one signal. For example, if the power converters 118A-126B are three-phase inverters, each of the power converters 118A-126B may include three phase-legs including one or more switches. In some embodiments, the power converters 118A-126B may be configured to generate AC power/current of various shapes including, but not limited to, a square wave, a sine wave, a modified sine wave, a pulsed sine wave, a pulse width modulated wave (PWM), and the like.

In some embodiments, during an operation of the power generation system 100, an electrical power to meet a total electrical power demand of the load 106 is shared among the first power generating unit 102 and the second power generating unit 104. More particularly, the electrical power to meet the total power demand of the load 106 may be shared among the power converters 118A-126B.

In one embodiment, the quantity of the electrical power to be supplied to the load 106 is equally shared among the first and second power converters 118A-126B of the first and second power generating units 102, 104. By way of example, during a normal operation of the power generation system 100, the first and second power generating units 102, 104 are configured to share about 50% of a total electrical power demand from the load 106. More particularly, the controllers 120A, 120B, 128A, 128B are configured to respectively operate the power converters 118A, 118B, 126A, 126B such that each of the power converters 118A-126B supply about 25% of the total electrical power demand from the load 106. In a non-limiting example, for a rated capacity of 1000 kilo-watts (kW), each of the power generating units 102, 104 may be configured to contribute 500 kW, where each of the power converters 118A-126B may be configured to contribute 250 kW. In another embodiment, the quantity of the electrical power to be supplied to the load 106 is shared unequally among the first and second power converters 118A-126B of the first and second power generating units 102, 104.

Figure 2:
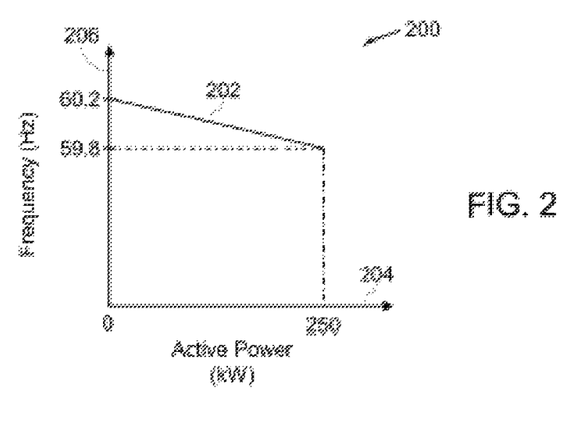
FIG. 2 is a graphical representation of first droop characteristics of a power converter employed in the power generation system of FIG. 1, in accordance with one embodiment of the present specification.

In some embodiments, during normal operation of the power generation system 100, the power converters 118A-126B are configured to generate active power and/or reactive power. More particularly, one or more of the power converters 118A-126B are configured to generate active power and/or reactive power are based on one or more droop characteristics (see FIGS. 2 and 3) under the control of the respective controllers 120A, 120B, 128A, 128B. Referring now to FIG. 2, a graphical representation 200 of first droop characteristics 202 of one power converter, for example, any of the power converters 118A-126B, employed in the power generation system 100 of FIG. 1, in accordance with one embodiment of the present specification. Reference numerals 204 and 206 respectively represent the X-axis and the Y-axis of the graphical representation 200. The X-axis 204 and the Y-axis 206 respectively represent active power in kilo-watts (kW) and frequency in Hertz (Hz) of the active power generated by any of the power converters 118A-126B. In the non-limiting example of FIG. 2, the first droop characteristics 202 indicates that the active power generated by any of the power converters 118A-126B may be varied from 0 kW (zero) to 250 kW (i.e., 25% of the rated capacity of the power generation system 100) when the frequency of the electrical power generated by the power converters 118A-126B is varied from 59.8 Hz to 60.2 Hz.

Figure 3:
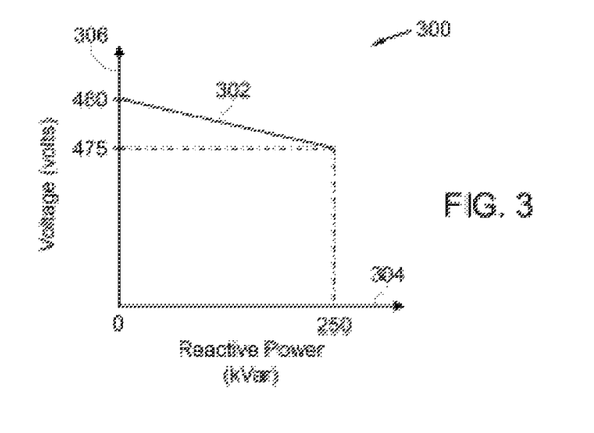
FIG. 3 is a graphical representation of second droop characteristics of a power converter employed in the power generation system of FIG. 1, in accordance with one embodiment of the present specification.

FIG. 3 is a graphical representation 300 of second droop characteristics 302 of one power converter, for example, any of the power converters 118A-126B, employed in the power generation system 100 of FIG. 1, in accordance with one embodiment of the present specification. Reference numerals 304 and 306 respectively represent the X-axis and the Y-axis of the graphical representation 300. The X-axis 304 and the Y-axis 306 respectively represent reactive power in kilo-Var (kVar) and voltage of the reactive power generated by any of the power converters 118A-126B. In the non-limiting example of FIG. 3, the second droop characteristics 302 indicates that the reactive power generated by any of the power converters 118A-126B may be varied from 0 kVar (zero) to 250 kVar (i.e., 25% of the rated capacity of the power generation system 100) when the voltage of the electrical power generated by the power converters 118A-126B is varied from 475 volts to 480 volts.

With returning reference to FIG. 1, the first sensors 122A-122D are disposed at various locations in the first power generating unit 102. In a non-limiting example, the first sensors 122A and 122B are connected at an output of the first power converters 118A and 118B, respectively. Moreover, the first sensors 122C and 122D are connected to the ends 107 and 109, respectively, of the power bus 108. Similarly, in the second power generating unit 104, the second sensors 130A-130D are disposed at various locations. In a non-limiting example, the second sensors 130A and 130B are connected at an output of the second power converters 126A and 126B, respectively. Moreover, the second sensors 130C and 130D are connected to the ends 110 and 112, respectively, of the power bus 108. Hereinafter, the first sensors 122A-122D and the second sensors 130A-130D may be alternatively referred to as the sensors 122A-130D.

In the description of FIG. 1, the sensors 122A-130D are described as current sensors. The sensors 122A-130D may generate signals indicative of a current flowing through their respective point of connection in the power generating units 102, 104. However, in some other non-limiting examples of the sensors that may be used as the sensors 122A-130D may include voltage sensors, temperature sensors, or combinations thereof.

Furthermore, in some embodiments, the first sensors 122A-122D and the second sensors 130A-130D may be coupled to the respective controllers 120A-120B and 128A-128B via wired control lines, as depicted in FIG. 1. In certain other embodiments, the first sensors 122A-122D and the second sensors 130A-130D may be coupled to the respective controllers 120A-120B and 128A-128B via a wireless communication medium. The wireless communication medium may be effected by wireless communication techniques based on Bluetooth®, Wi-Fi® (IEEE 802.11), WiMAX® (IEEE 802.16), Wi-Bro®, cellular communication techniques, such as, but not limited to global system for mobile (GSM) communications or code division multiple access (CDMA), data communication techniques, including, but not limited to, broadband, 2G, 3G, 4G, or 5G.

The controllers 120A, 120B, 128A, 128B, hereinafter referred to as controllers 120A-128B, may be configured to control operation of the power converters 118A, 118B, 126A, 126B, respectively. More particularly, the controllers 120A-128B are configured to control switching of the switches contained respectively in the power converters 118A-126B to generate a desired output. The desired output may be a desired magnitude and/or frequency of an AC voltage, a AC current, and/or AC power. In some embodiments, the controllers 120A-128B are configured to control the operation of the power converters 118A-126B based on the electrical signals received from the respective sensors 122A-122D, 130A-130D. As used herein, the term "controller" may refer to hardware elements such as integrated circuits, a computer, a microcontroller, a microprocessor, a programmable logic controller (PLC), a specification specific integrated circuit, specification-specific processor, digital signal processors (DSPs), application specific integrated circuits (ASICs), field programmable gate arrays (FPGAs), and/or any other programmable circuits. Further, the "controller" may include input/output ports, and a storage medium, such as an electronic memory. Further, the "controller" may be a single-core type or multi-core type. Alternatively, the "controller" may be implemented as software running on a processor such as a personal computer (PC), or the microcontroller.

During the operation of the power generation system 100, one or more of the power converters 118A-126B may experience a determined operating condition. In some embodiments, the determined operating condition may include a complete failure, a partial failure, a malfunction condition, an overheating condition, or combinations thereof. By way of example, the complete failure may be representative of an operating condition of a given power converter when all phase-legs of the given power converter stop functioning due to failure of one or more switches contained in the phase-legs. Further, by way of another example, the partial failure may be representative of an operating condition of the given power converter when one or more but not all phase-legs of the given power converter stop functioning. Furthermore, by way of another example, the malfunction condition may be representative of an operating condition of the given power converter when one or more phase-legs of the given power converter generate electrical power deviating from its desired output power. Moreover, by way of yet another example, the overheating condition may be representative of an operating condition of the given power converter when a temperature of the power converter or one or more switches used in the power converter raises above a threshold value.

Accordingly, in some embodiments, the controllers 120A-128B may be configured to detect if the respective one of the power converters 118A-126B is experiencing the determined operating condition. If it is detected that one or more of the power converters 118A-126B are experiencing the determined operating condition, in some embodiments, the operation of remaining power converters of the power converters 118A-126B may be controlled such that the total electrical power demand of the load 106 is met uninterrupted. By way of example, the remaining power converters are the ones that are not experiencing the determined operating condition. In order to maintain such continuity in the electrical power delivery to the load 106, one or more of the controllers 120A-128B may be configured to modify operating characteristics, for example, the one or more droop characteristics (see FIGS. 2 and 3) of the remaining converters. By way of example, FIGS. 4 and 5 represent modified droop characteristics.

In a non-limiting example, at least one first controller, for example, the first controller 120A, is configured to detect the determined operating condition corresponding to at least one first power converter, such as, the first power converter 118A, of the plurality of first power converters 118A, 118B. Further, in some embodiments, if the determined operating condition is detected, the first controller 120B may be configured to control a load current flowing through the power bus 108 via at least one remaining first power converter, for example, the first power converter 118B. Additionally, at least one second controller 128A, 128B operatively coupled the plurality of second power converters 126A, 126B is configured to alter one or more droop characteristics corresponding to the plurality of second power converters 126A, 126B based on the controlled load current flowing through the power bus 108. Moreover, the first controller 120B is also configured to alter one or more droop characteristics of the first power converter 118B. Additional details of operations performed by one or more of the controllers 120A-128B to operate the power generation system 100 are illustrated with reference to a method described in FIG. 6.

Figure 4:
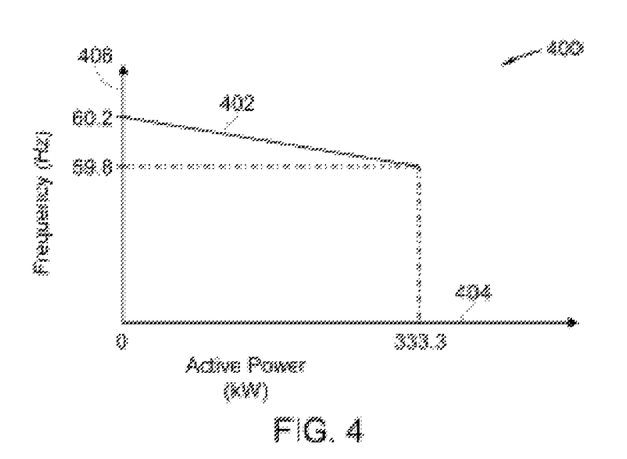
FIG. 4 is a graphical representation of modified first droop characteristics, in accordance with one embodiment of the present specification.

Referring now to FIG. 4, a graphical representation 400 depicting modified first droop characteristics 402 is presented, in accordance with one embodiment of the present specification. Reference numerals 404 and 406 respectively represent the X-axis and the Y-axis of the graphical representation 400. The X-axis 404 and the Y-axis 406 respectively represent active power (kW) and frequency (Hz) of the active power generated by any of the power converters 118B, 126A, 126B. In the non-limiting example of FIG. 4, the modified first droop characteristics 402 indicates that the active power generated by any of the power converters 118B, 126A, 126B may be varied from 0 kW (zero) to 333.3 kW when the frequency of the electrical power generated by the power converters 118B, 126A, 126B is varied from 59.2 Hz to 60.2 Hz. In particular, due to such change in the first droop characteristics, the power converters 118B, 126A, 126B can generate about 83.3 kW of excess active power, thereby compensating for a deficiency of active power from the power converter 118A.

Figure 5:
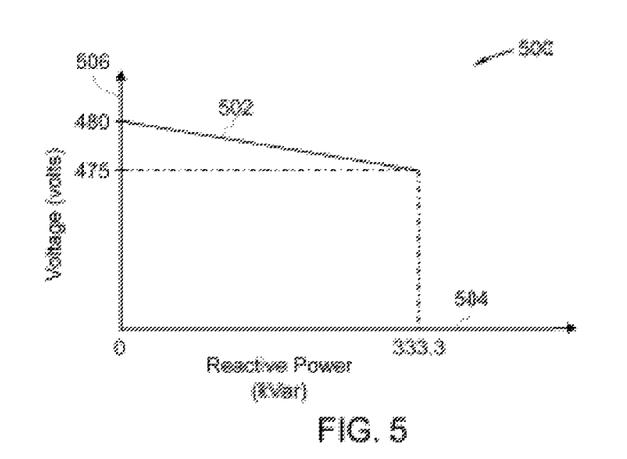
FIG. 5 is a graphical representation of modified second droop characteristics, in accordance with one embodiment of the present specification.

Moreover in FIG. 5, a graphical representation 500 depicting modified second droop characteristics 502 is presented, in accordance with one embodiment of the present specification. Reference numerals 504 and 506 respectively represent the X-axis and the Y-axis of the graphical representation 500. The X-axis 504 and the Y-axis 506 respectively represent reactive power (kVar) and voltage (volts) of the reactive power generated by any of the power converters 118B, 126A, 126B. In the non-limiting example of FIG. 5, the modified second droop characteristics 502 indicates that the reactive power generated by any of the power converters 118B, 126A, 126B may be varied from 0 kVar (zero) to 333.3 kVar when the voltage of the electrical power generated by the power converters 118B, 126A, 126B is varied from 475 volts to 480 volts. In particular, due to such change in the second droop characteristics, the power converters 118B, 126A, 126B can generate about 83.3 kVar of excess reactive power, thereby compensating for a deficiency of reactive power from the power converter 118A.

Figure 6:
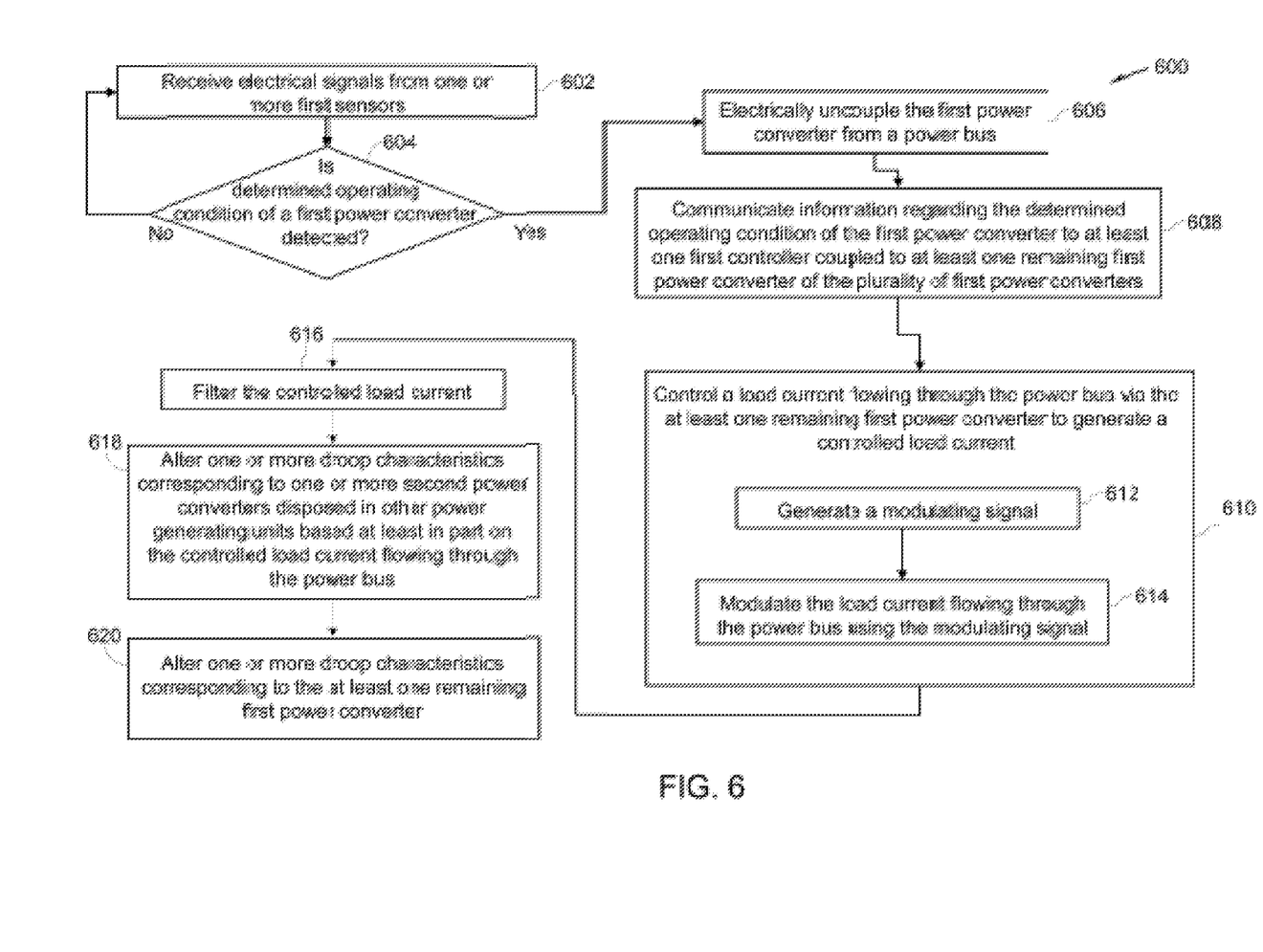
FIG. 6 is a flow diagram of a method for operating the power generation system of FIG. 1, in accordance with one embodiment of the present specification.

Referring now to FIG. 6, a flow diagram 600 of a method for operating the power generation system 100 of FIG. 1 is presented, in accordance with one embodiment of the present specification. By way of example, the flow diagram 600 illustrates a method for operating the power generation system 100 when one or more of the power converters 118A-126B experience the determined operating condition. As previously noted, the determined operating condition may include the complete failure, the partial failure, the malfunction condition, the overheating condition, or combinations thereof.

By way of a non-limiting example and for ease of illustration, the method of FIG. 6 is described with respect to a situation when the first power converter 118A experiences the determined operating condition. It is to be noted that the method of FIG. 6 is also applicable to the situations when any other of the power converters 118B, 126A, 126B experiences the determined operating condition.

At step 602, the first controller 120A may be configured to receive electrical signals from the one or more first sensors 122A, 122C connected thereto. By way of example, the electrical signal received from the sensor 122A may be indicative of the current supplied to the power bus 108 from the power converter 118A. The electrical signal received from the sensor 122C may be indicative of the load current flowing through the power bus 108. In other non-limiting example, when temperature sensors are employed, the first controller 120A may receive electrical signals indicative of the temperature of the first power converter 118A.

Further, at step 604, a check may be performed by the first controller 120A to detect the determined operating condition of the first power converter 118A. More particularly, detecting the determined operating condition at step 604 includes determining whether the first power converter 118A experiences the determined operating condition based on the electrical signal received from the sensors 122A and/or 122B. By way of example, the first controller 120A may detect the determined operating condition of the first power converter 118A based on one or more properties such as a magnitude, a frequency, or a phase of the electrical signals received from the sensors 122A and/or 122B. If values of the one or more properties of the electrical signal is not in a desired predefined range, the first controller 120A may determine that the first power converter 118A experiences the determined operating condition. In certain other embodiments, if the temperature of the first power converter 118A is raises above a threshold temperature value, the first controller 120A may determine that the first power converter 118A experiences the determined operating condition.

At step 604, if it is detected that the first power converter 118A does not experience the determined operating condition, a control may be passed to step 602. However, at step 604, if it is detected that the first power converter 118A experiences the determined operating condition, one or more of the controllers 120A-128B may respond to the determined operating condition by performing necessary control actions.

For example, at step 606, the first controller 120A is configured to electrically uncouple the first power converter 118A from the power bus 108. In some embodiments, to electrically uncouple the first power converter 118A from the power bus 108, the first controller 120A may discontinue operating the switches disposed in the first power converter 118A by stopping the control signals supplied thereto. In some other embodiments, the first controller 120A may be configured to disconnect the first power converter 118A from the power bus 108 via a circuit breaker (not shown) that may be disposed between the first power converter 118A and the power bus 108.

Further, at step 608, the first controller 120A is configured to communicate information regarding the determined operating condition of the first power converter 118A from the first controller 120A to at least one first controller 120B coupled to at least one remaining first power converter 118B. In particular, the first controller 120A may be configured to send a status signal to the first controller 120A indicating that the power converter 118A has experienced the determined operating condition. Further, in response to receiving the status signal from the first controller 120A, the load current flowing through the power bus 108 may be controlled via the at least one remaining first power converter 118B, as indicated by step 610, to generate a controlled load current. In some embodiments, the method of controlling the load current flowing through the power bus 108 may include sub-steps 612, 614.

Figure 7:
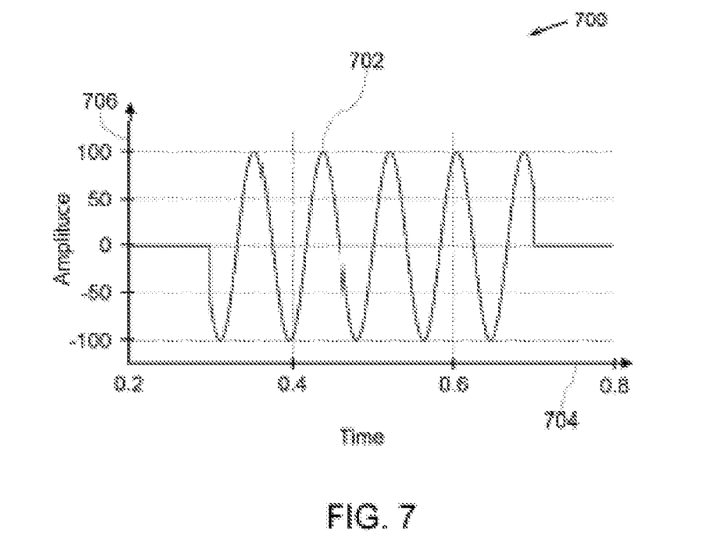
FIG. 7 is a graphical representation of a modulating signal used to generate a controlled load current, in accordance with one embodiment of the present specification.

Furthermore, at sub-step 612, the controller 120B may be configured to operate the power converter 118B (i.e., a remaining power converter in the power generating unit 102 that is not experiencing the determined operating condition) such that the power converter 118B generate a power that includes a modulating signal (see FIG. 7). Referring now to FIG. 7, a graphical representation 700 of a modulating signal 702 is presented, in accordance with one embodiment of the present specification. Reference numerals 704 and 706 respectively represent the X-axis and the Y-axis of the graphical representation 700. In the graphical representation, the X-axis 704 and the Y-axis 706 respectively represent amplitude and time. In some embodiments, the modulating signal 702 may be a low frequency modulating signal.

With returning reference to FIG. 6, at sub-step 614, in some embodiments, the load current flowing through the power bus 108 may be modulated via the at least one remaining first power converter (e.g., the first power converter 118B) of the plurality of first power converters 118A, 118B using the modulating signal. By way of example, modulation techniques that may be used to modulate the load current may include one or more of an amplitude modulation, a frequency modulation, a phase modulation, a pulse width modulation (PWM), and the like. In a non-limiting example, modulating the load current using the amplitude modulation technique includes varying an amplitude of the load current in accordance with the amplitude of the modulating signal.

In some embodiments, to modulate the load current flowing through the power bus 108, the first controller 120B may be configured to operate the first power converter 118B such that the modulating signal is supplied to the power bus 108. In some embodiments, the modulating signal may be supplied to the power bus 108 along with a current supplied from the first power converter 118B to the power bus 108. In certain embodiments, the modulating signal may be superimposed on the current supplied from the first power converter 118B to the power bus 108. Therefore, when the modulating signal is supplied to the power bus 108, the current flowing though the power bus 108 may be modulated. Such modulated load current is also hereinafter referred to as a controlled load current (see FIG. 8).

Figure 8:
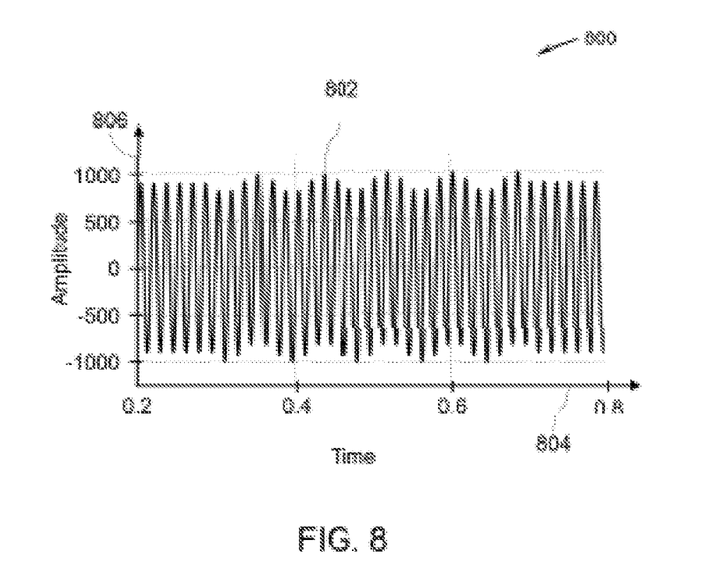
FIG. 8 is a graphical representation of the controlled load current flowing through a power bus, in accordance with one embodiment of the present specification.

In FIG. 8, a graphical representation 800 of an example controlled load current 802 flowing through the power bus 108 after the detection of the determined operating condition is presented, in accordance with one embodiment of the present specification. Reference numerals 804 and 806 respectively represent the X-axis and the Y-axis of the graphical representation 800. The X-axis 804 and the Y-axis 806 respectively represent amplitude and time. In the example of FIG. 8, the controlled load current 802 represents an amplitude modulated load current flowing through the power bus 108. In particular, an amplitude of the controlled load current is varied in accordance with the amplitude of the modulating signal 702.

Referring again to FIG. 6, after sub-step 614 is executed, the controlled load current flows through the power bus 108. In some embodiments, a flow of the controlled load current through the power bus 108 may be indicative of the one or more power converters (e.g., the first power converter 118A) experiencing the determined operating condition.

At step 616, the second controllers 128A, 128B disposed in the second power generating unit 104 may be configured to filter the controlled load current to determine a spectral component corresponding to the modulating signal. By way of example, filtering of the controlled load current may include demodulating the controlled load current. The second controllers 128A, 128B may receive electrical signals indicative of the controlled current flowing through the power bus 108 respectively from the second sensors 130C and 130D. Further, the electrical signals received from the second sensors 130C and 130D may be filtered by the second controllers 128A, 128B, respectively, to determine the spectral component corresponding to the modulating signal. In some embodiments, the magnitude of the spectral component corresponding to the modulating signal may be indicative of the number of power converters that are experiencing the determined operating condition. Accordingly, the second controllers 128A, 128B may determine the number of available power converters (i.e., the power converters that are not experiencing the determined operating condition) and the amount of active and/or reactive power to be supported by the second power converters 126A, 126B based on the rated capacity of the power generation system 100. In certain other embodiments, the magnitude of the spectral component corresponding to the modulating signal may be indicative of the quantity of active and/or reactive power desirable from the second power converters 126A, 126B.

Further, at step 618, one or more droop characteristics corresponding to one or more second power converters 126A, 126B disposed in other power generating units (e.g., the power generating unit 104) may be altered based at least in part on the controlled load current flowing through the power bus 108. In some embodiments, the second controllers 128A, 128B may be configured to alter one or more droop characteristics corresponding to one or more second power converters 126A, 126B. In some embodiments, to modify the one or more droop characteristics of the second power converters 126A, 126B, the controllers 128A, 128B may send active power commands and/or reactive power commands to the respective second power converters 126A, 126B. Accordingly, control circuits, for example, driver circuits (not shown) disposed in the second power converters 126A, 126B may apply current commands/control signals to the switches in the respective second power converters 126A, 126B in accordance with the changed/modified droop characteristics. As noted earlier, in a non-limiting example, FIGS. 2 and 3 represent the one or more droop characteristics that may be modified to achieve one or more modified droop characteristics.

Accordingly, in some embodiments, altering the one or more droop characteristics includes increasing an active power capability of the one or more second power converters disposed in other power generating units (see FIG. 4). In certain embodiments, altering the one or more droop characteristics includes increasing a reactive power capability of the one or more second power converters disposed in other power generating units (see FIG. 5).

Moreover, at step 620, one or more droop characteristics corresponding to the at least one remaining first power converter 118B may also be altered by the first controller 120B. As noted earlier, in a non-limiting example, FIGS. 2 and 3 represent the one or more droop characteristics that may be modified to achieve one or more modified droop characteristics. The one or more modified droop characteristics are depicted in FIGS. 4 and 5, as described earlier. In one embodiment, the first controller 120B may be configured to alter the droop characteristics corresponding to the at least one remaining first power converter 118B based at least in part on a total number of available power converters in the plurality of power generating units 102, 104 and on the total rated capacity of the power generation system 100. The term "total number of available power converters" may be representative of the number of the power converters that are not experiencing the determined operating condition. In the present example, three power converters 118B, 126A, 126B are not experiencing the determined operating condition and the total rated capacity of the power generation system 100 is 1000 kW. Accordingly, in a non-limiting example, the total rated capacity of 1000 kW is divided by three to obtain desired modified droop characteristics (e.g., the active power of 333.3 kW and/or the reactive power of 333.3 kW) of the first power converter 118B.

As noted herein above, in some embodiments, the one or more droop characteristics of the two or more power converters other than the first power converter 118A (e.g., the power converters 118B, 126A, 126B) may be altered such that about equal or equal amount of active power may be supplied from each of the power converters 118B, 126A, 126B to the power bus 108. In such operation of the power generation system 100, the one or more droop characteristics of the power converters 118B, 126A, 126B may be adjusted to be substantially identical. For example, as depicted in FIGS. 4 and 5, the droop characteristics may be modified such that each of the remaining power converters 118B, 126A, 126B may generate about 333.3 kW of active power or 333.3 kVar of reactive power.

In certain embodiments, the one or more droop characteristics of the two or more power converters other than the first power converter 118A (e.g., the power converters 118B, 126A, 126B) may be altered such that a different/unequal amount of the active power may be supplied from each of the power converters 118B, 126A, 126B to the power bus 108. In such operation of the power generation system 100, the one or more droop characteristics of the power converters 118B, 126A, 126B may be different.

The exemplary process steps such as those that may be performed by the exemplary system may be implemented by suitable code on a processor-based system such as a general-purpose or special-purpose computer. It should also be noted herein that different exemplary implementations may perform some or all of the steps described herein in different orders or substantially concurrently. Furthermore, the functions may be implemented in a variety of programming languages including but not limited to C++ or Java. Such code may be stored or adapted for storage on one or more tangible, machine readable media such as on data repository chips, local or remote hard disks, optical disks (that is, CDs or DVDs), memory or other media, which may be accessed by a processor-based system to execute the stored code. The tangible media may include paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

In accordance with the embodiments described herein, improved power generation system 100 and method of operating the power generation system 100 are provided. In an event of one or more power converters (e.g., the power converter 118A) experiencing the determined operating condition such as a complete failure, a partial failure, a malfunction condition, an overheating condition, or combinations thereof, the improved method described herein facilitates altering operating capabilities of the remaining power converters (e.g., the power converters 118B, 126A, 126B) to continue supply of the electrical power to the load 106. More particularly, the controllers 120B, 128A, 128B are configured to alter the one or more droop characteristics of the power converters 118B, 126A, 126B, respectively. Advantageously, supply of the electrical power to the load 106 may not be discontinued despite of the power converter 118A experiencing the determined operating condition. Moreover, the controllers 128A, 128B undertake this corrective action by detecting the controlled load current flowing through the power bus 108. Operations of the power converters 118A-126B are synchronized via a use of the controlled load current to alter/adapt the respective one or more droop characteristics. Advantageously, use of expensive communication devices between the power generating units 102, 104 may be eliminated.

In one embodiment, a method is provided for a power generation system that can include detecting an operating condition of a first power converter that is one of a first set of power converters. The power converters can be configured to receive first direct current output from a first power source in power generating units. The method can also include responding to detection of the operating condition by controlling, via at least one second power converter in the first set of power converters, a load current can be conducted through a power bus coupled to the power generating units. The at least one second power converter in the first set of power converters may not experience the operating condition. The method can also include responding to detection of the operating condition by altering one or more droop characteristics corresponding to one or more third power converters. The one or more third power converters can be configured to receive second direct current output from a second power source in the power generating units based at least in part on the load current that is controlled and conducted through the power bus. The one or more third power converters can be coupled to the power bus, and the one or more droop characteristics can be altered so that a total electrical power demand of a load is met uninterrupted.

Optionally, the method can also include electrically uncoupling the first power converter having the operating condition from the power bus. Optionally, controlling the load current can include modulating the load current conducted through the power bus via the at least one second power converter of the first set of power converters. Optionally, modulating the load current can include varying an amplitude of the load current. Optionally, modulating the load current can include supplying a modulating signal to the power bus via the at least one second power converter of the first set of power converters. Optionally, the method can also include filtering the load current that can be controlled to determine a spectral component corresponding to the modulating signal. Optionally, altering the one or more droop characteristics can include increasing an active power capability of the one or more third power converters in the power generating units. Optionally, altering the one or more droop characteristics can include increasing a reactive power capability of the one or more third power converters in the power generating units. Optionally, the method can include supplying an about equal amount of active power to the power bus by two or more power converters other than the first power converter. Optionally, the method can include supplying unequal amount of active power to the power bus by two or more power converters other than the first power converter. Optionally, the method can include altering one or more droop characteristics of the at least one second power converter based at least in part on a total number of available power converters in the power generating units and on a total rated capacity of a power generation system.

In one embodiment, a power generation system is provided that can include first and second power generating units. The first power generating unit can be electrically coupled to a load via a power bus. The first power generating unit can include first power converters configured to receive first direct current output from a first power source and at least one first controller that can be operatively coupled to the first power converters. The at least one first controller can be configured to detect an operating condition corresponding to at least one first power converter of the first power converters. The at least one first controller can also be configured to control, responsive to detecting the operating condition, a load current conducted through the power bus via at least one second power converter of the first power converters. The second power generating unit can be electrically coupled to the power bus. The second power generating unit can include second power converters that can be configured to receive second direct current output from a second power source. The second power generating unit can also include at least one second controller that can be operatively coupled to the second power converters. The at least one second controller can be configured to alter one or more droop characteristics corresponding to the second power converters, based on the load current. The load current can be controlled and conducted through the power bus so that a total electrical power demand of a load is met uninterrupted.

Optionally, each of the first power generating unit and the second power generating unit can include a respective vehicle. Optionally, the first power converters can be coupled in parallel with each other, and the second power converters can be coupled in parallel with each other. Optionally, the operating condition can include a complete failure, a partial failure, a malfunction condition, an overheating condition, or combinations thereof. Optionally, the first power converters and the second power converters can include a plurality of inverters. Optionally, the at least one second power converter can be configured to modulate the load current conducted through the power bus to generate the load current that is controlled. Optionally, the at least one second controller can be further configured to filter the load current that is controlled.

In an embodiment, a system is provided that can include first and second power generating units. The first power generating unit can be configured to be electrically coupled to a load via a power bus. The first power generating unit can include first and second power converters that can be configured to receive first direct current output from a first power source. A first sensor can be configured to be coupled to the power bus. The first power generating unit can also include a first controller operatively coupled to the first and second power converters. The first controller can be configured to detect an operating condition corresponding to the first power converter. The first controller can also be configured to control, responsive to detecting the operating condition, a load current conducted through the power bus via the second power converter. The second power generating unit can be configured to be electrically coupled to the power bus. The second power generating unit can include third and fourth power converters that can be configured to receive second direct current output from a second power source. Further, the second power generating unit can also include a second sensor that can be configured to be coupled to the third and fourth power converters. Furthermore, the second power generating unit can also include a second controller that can be operatively coupled with the third and fourth power converters. The second controller can be configured to alter one or more droop characteristics corresponding to the third and fourth power converters based on the load current. The load current can be controlled so that a total electrical power demand of a load is met uninterrupted.

Optionally, the second controller can be configured to filter the load current that is controlled.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A method comprising:
   detecting a fault condition of a first power converter that is included in a first set of power converters configured to receive first direct current output from a first power source of a first power generating unit, the first power generating unit including a first vehicle, wherein the first set of power converters and the first power source are disposed onboard the first vehicle; and
   responding to detection of the fault condition by:
      controlling, via at least one second power converter in the first set of power converters, a load current conducted through a power bus coupled to the first power generating unit, wherein the at least one second power converter in the first set of power converters does not experience the fault condition;
      receiving electrical signals at a second power generating unit indicative of the load current conducted through the power bus that is output by the at least one second power converter in the first set of power converters of the first power generating unit, the second power generating unit including a second vehicle; and
      altering one or more droop characteristics corresponding to one or more third power converters that are configured to receive second direct current output from a second power source of the second power generating unit, the one or more droop characteristics based at least in part on the electrical signals indicative of the load current that is controlled and conducted through the power bus via the second power converter of the first power generating unit, wherein the one or more third power converters and the second power source are disposed onboard the second vehicle, wherein the one or more third power converters are coupled to the power bus, and wherein the one or more droop characteristics are altered so that a total electrical power demand of a load is met uninterrupted.

2. The method of claim 1, further comprising electrically uncoupling the first power converter having the fault condition from the power bus.

3. The method of claim 1, wherein controlling the load current comprises modulating the load current conducted through the power bus via the at least one second power converter of the first set of power converters.

4. The method of claim 3, wherein modulating the load current comprises varying an amplitude of the load current.

5. The method of claim 3, wherein modulating the load current comprises supplying a modulating signal to the power bus via the at least one second power converter of the first set of power converters.

6. The method of claim 5, further comprising filtering the load current that is controlled to determine a spectral component corresponding to the modulating signal.

7. The method of claim 1, wherein altering the one or more droop characteristics comprises increasing an active power capability of the one or more third power converters in the second power generating unit.

8. The method of claim 1, wherein altering the one or more droop characteristics comprises increasing a reactive power capability of the one or more third power converters in the second power generating unit.

9. The method of claim 1, further comprising supplying an about equal amount of active power to the power bus by two or more power converters other than the first power converter.

10. The method of claim 1, further comprising supplying unequal amount of active power to the power bus by two or more power converters other than the first power converter.

11. The method of claim 1, further comprising altering one or more droop characteristics of the at least one second power converter based at least in part on a total number of available power converters in one or more of the first or second power generating units and based on a total rated capacity of a power generation system.

12. A power generation system, comprising:
   a first power generating unit electrically coupled to a load via a power bus, the first power generating unit comprising:
      first power converters configured to receive first direct current output from a first power source, the first power converters and the first power source disposed onboard a first vehicle; and
      at least one first controller operatively coupled to the first power converters and disposed onboard the first vehicle, wherein the at least one first controller is configured to:
         detect a fault condition corresponding to at least one first power converter of the first power converters; and
         control, responsive to detecting the fault condition, a load current conducted through the power bus via at least one second power converter of the first power converters; and
   a second power generating unit separated from the first power generating unit and electrically coupled to the power bus, the second power generating unit comprising:
      second power converters configured to receive second direct current output from a second power source, the second power converters and the second power source disposed onboard a second vehicle; and
      at least one second controller operatively coupled with the second power converters and disposed onboard the second vehicle, wherein the at least one second controller is configured to receive electrical signals indicative of the load current conducted through the power bus that is output by the at least one second power converter of the first power converters, the at least one second controller configured to alter one or more droop characteristics corresponding to the second power converters based at least in part on the electrical signals indicative of the load current that is controlled and conducted through the power bus via the at least one second power converter of the first power generating unit, wherein the one or more droop characteristics are altered so that a total electrical power demand of a load is met uninterrupted.

13. The power generation system of claim 12, wherein the first power converters disposed onboard the first vehicle are coupled in parallel with each other, and the second power converters disposed onboard the second vehicle are coupled in parallel with each other.

14. The power generation system of claim 12, wherein the fault condition comprises a complete failure, a partial failure, a malfunction condition, an overheating condition, or combinations thereof.

15. The power generation system of claim 12, wherein the first power converters and the second power converters comprise a plurality of inverters.

16. The power generation system of claim 12, wherein the at least one second power converter is configured to modulate the load current conducted through the power bus to generate the load current that is controlled.

17. The power generation system of claim 12, wherein the at least one second controller is further configured to filter the load current that is controlled.

18. The power generation system of claim 12, wherein the at least one first controller is configured to electrically uncoupling the at least one power converter or the first power converters responsive to detection of the fault condition of the at least one power converter.

19. A system comprising:
a first power generating unit configured to be electrically coupled to a load via a power bus, the first power generating unit comprising:
first and second power converters configured to receive first direct current output from a first power source, a first sensor configured to be coupled to the power bus, the first and second power converters, the first power source, and the first sensor disposed onboard a first vehicle; and
a first controller operatively coupled to the first and second power converters and disposed onboard the first vehicle, wherein the first controller is configured to detect a fault condition corresponding to the first power converter, and control, responsive to detecting the fault condition, a load current conducted through the power bus via the second power converter; and
a second power generating unit configured to be electrically coupled to the power bus, the second power generating unit comprising:
third and fourth power converters configured to receive second direct current output from a second power source, a second sensor configured to be coupled to the power bus, the third and fourth power converters, the second power source, and the second sensor disposed onboard a second vehicle; and
a second controller operatively coupled with the third and fourth power converters and disposed onboard the second vehicle,
wherein the second controller is configured to receive electrical signals sensed by the second sensor indicative of the load current output by the second power converter and conducted through the power bus,
the second controller configured to alter one or more droop characteristics corresponding to the third and fourth power converters based on the load current that is output by the second power converter controlled so that a total electrical power demand of a load is met uninterrupted.

20. The power generation system of claim 19, wherein the second controller is configured to filter the load current that is controlled.

* * * * *